United States Patent [19]
Doyle

[11] Patent Number: 5,457,869
[45] Date of Patent: Oct. 17, 1995

[54] SLAT REMOVAL AND NAIL STUBBLE ELIMINATION APPARATUS FOR USE IN REPAIRING PALLETS

[76] Inventor: James J. Doyle, 1851 Hidden Oaks Dr., Germantown, Tenn. 37138

[21] Appl. No.: 986,289

[22] Filed: Dec. 7, 1992

[51] Int. Cl.⁶ .................................................. B23P 19/04
[52] U.S. Cl. ........................... 29/564.3; 29/239; 29/426.4
[58] Field of Search ................................ 29/564.1, 564.3, 29/239, 426.4, 252, 253, 564.7

[56] References Cited

U.S. PATENT DOCUMENTS

| | | |
|---|---|---|
| 3,512,242 | 5/1970 | Harvis . |
| 3,651,554 | 3/1972 | Herbert ............................ 29/564.1 |
| 3,740,815 | 6/1973 | Campbell et al. . |
| 3,822,861 | 7/1974 | Scott .............................. 254/93 HP |
| 3,823,861 | 7/1974 | Jureit et al. ........................ 227/153 |
| 3,846,890 | 11/1975 | Bielkiewicz . |
| 3,869,783 | 3/1975 | Spencer . |
| 3,875,643 | 4/1975 | Cramer . |
| 3,899,816 | 8/1975 | Jennings . |
| 3,916,498 | 11/1975 | Lopez et al. . |
| 3,991,459 | 11/1976 | Rapp . |
| 4,089,098 | 5/1978 | DeMarco . |
| 4,112,578 | 9/1978 | Sanford . |
| 4,204,624 | 5/1980 | Gunn et al. ........................... 227/45 |
| 4,285,110 | 8/1981 | Fagre, Jr. . |
| 4,295,591 | 10/1981 | Lundström ............................ 227/142 |
| 4,433,464 | 2/1984 | Herbert .................................. 29/252 |
| 4,900,329 | 2/1990 | Richardelli ............................. 29/430 |
| 4,945,626 | 8/1990 | Dykstra et al. ...................... 29/564.3 |
| 4,947,530 | 8/1990 | Gleason ............................. 29/402.14 |
| 5,121,540 | 6/1992 | Dykstra ................................ 29/772 |
| 5,137,066 | 8/1992 | Dimter ............................... 144/2 R |
| 5,154,687 | 10/1992 | Jeslis .................................. 493/12 |

FOREIGN PATENT DOCUMENTS 2271310  4/1994  United Kingdom .

OTHER PUBLICATIONS

Gordon J. Pick, Oatfield Lane, Radcliffe–On–Trent, *The Green Machine Pallet Dismantler* brochure, believed as early as May 26, 1993, 4 pages.

*Primary Examiner*—William Briggs

[57] ABSTRACT

Apparatus for use in repairing damaged pallets, having both a slat removal station and a nail stubble elimination station. In a preferred embodiment, the stations are in close proximity to one another, with the apparatus having a plurality of hydraulicly actuated fingers for removing a damaged slat, and vertically opposed upper and lower press bars activated by hydraulic and pneumatic actuators, respectively, for clamping the pallet end immediately subsequent to the removal of a slat therefrom, thereby flattening the resulting nail stubble and preparing the pallet for replacement of the removed slat.

8 Claims, 8 Drawing Sheets

SLAT REMOVAL AND NAIL STUBBLE ELIMINATION APPARATUS FOR USE IN REPAIRING PALLETS

BACKGROUND OF THE INVENTION

1. Field

The present invention relates to devices for repairing damaged pallets and, more particularly, to a single apparatus adapted to remove a damaged slat and eliminate the resulting nail stubble.

2. Description of the Prior Art

Conventional wooden pallets have been utilized for many years in the cargo handling industry as a convenient means of storing and transporting a wide variety of merchandise. Such pallets typically consist of a plurality of longitudinal support stringers, usually three, bounded on the top and bottom by a plurality of transverse slats, and are frequently damaged in use. Continued use of a damaged pallet results in a distinct safety hazard, as a structurally unsound pallet may allow the merchandise stacked thereon to shift and/or fall, sometimes without any notice or warning. Accordingly, replacement of damaged pallets is a common occurrence.

Replacement of a pallet typically consists of either scrapping the damaged pallet and purchasing a new one in its place, or repairing the damaged pallet. In recent years, as rising material costs have created a greater concern to large volume users of pallets, repairing damaged pallets has become an increasingly attractive option. A number of devices have been designed and marketed to facilitate the disassembly, or partial disassembly, and repair of damaged pallets.

It is estimated that in 80% of the damaged pallets, only the end slat or slats need be replaced. On an individual basis, repair is a simple operation, requiring only removal and replacement of the damaged slat (or slats). In practice, however, this operation is painfully labor intensive, particularly on a high volume. Once the damaged slat is removed, the exposed broken nails and/or nail heads, commonly referred to as "nail stubble" must be removed so that another slat may be secured in place of the damaged slat.

The following U.S. patents disclose various apparatus for disassembling wooden pallets: U.S. Pat. No. 3,512,242, issued May 19, 1970 to Harvis; U.S. Pat. No. 3,740,815, issued Jun. 26, 1973 to Campbell, et al.; U.S. Pat. No. 3,846,890, issued Nov. 12, 1974 to Bielkiewicz; U.S. Pat. No. 3,869,783, issued Mar. 11, 1975 to Spencer; U.S. Pat No. 3,875,643, issued Apr. 8, 1975 to Cramer; U.S. Pat. No. 3,899,816, issued Aug. 19, 1979 to Jennings; U.S. Pat. No. 3,916,498, issued Nov. 4, 1975 to Lopez, et al; U.S. Pat. No. 3,991,459, issued Nov. 16, 1976 to Rapp; U.S. Pat. No. 4,089,098, issued May 16, 1978 to DeMarco; U.S. Pat. No. 4,112,578, issued Sep. 12, 1978 to Sanford; and U.S. Pat. No. 4,285,110, issued Aug. 25, 1981 to Fagre, Jr. While these patents disclose a wide variety of methods and apparatus for disassembling pallets, none of these references addresses the problem of nail stubble which must be eliminated prior to the replacement of a removed, damaged slat.

With the numerous slat removal methods and apparatus disclosed in the above cited patents, the process of eliminating nail stubble has become one of the most time consuming and, therefore, costly steps in the entire repairing/refurbishing process. Typically, nail stubble is removed manually by a plurality of operators using hammers to flatten the nails against the stringers. Accordingly, a need has been recognized in the industry for an apparatus to minimize the time consumed in nail stubble elimination. More particularly, a need has arisen for an apparatus which will enable one operator to remove a damaged slat and eliminate nail stubble at a single work station in a minimum amount of time.

BRIEF SUMMARY OF THE INVENTION

A primary object of the present invention is to provide an apparatus for quickly and efficiently eliminating nail stubble resulting from the removal of a damaged slat. Another object is to provide a single apparatus which accomplishes both functions of removing a damaged slat and eliminating the resulting nail stubble.

A further object of the present invention is to provide an apparatus which significantly reduces the amount of time required to flatten or otherwise eliminate nail stubble. A still further object is to provide an apparatus which minimizes the time required between the removal of a damaged slat and the elimination of nail stubble.

Another object of this invention is to provide an apparatus which enables an operator to remove a damaged slat and eliminate nail stubble while remaining at a single work station. A still further object is to minimize the handling required in the pallet repairing and refurbishing process.

To achieve these and other objects, the present invention comprises an apparatus having a vertically disposed stationary frame with an opening therethrough for receiving an end of a pallet. At the rear of the frame adjacent the opening is mounted a slat removal station, which, upon activation by the operator, quickly removes the damaged end slat and allows the slat to fall, preferably onto a conveyor for transporting to another area. Mounted within the frame is a slidable yoke assembly, the top member of which serves as an upper press bar for engaging the top surface of the pallet. The yoke assembly is selectively movable by the operator between raised and lowered positions, with the upper press bar moving accordingly. Facing the upper press bar is a lower press bar, which is similarly movable between raised and lowered positions upon activation by the operator. After the damaged slat is removed, the operator is able to pull the pallet back a few inches to reposition the area from which the damaged slat was removed between the upper and lower press bars, which together comprise a nail stubble elimination situation. Activation of driving mechanisms simultaneously moves the upper press bar to its lowered position, and the lower press bar to its upper position, thereby tightly clamping the affected portion of the stringers and flattening the nail stubble extending therefrom. In the preferred embodiment disclosed herein, the driving mechanism for both the slat removal station and the nail stubble eliminating station comprise foot operated hydraulic and pneumatic cylinders.

Additional features and advantages provided by the principals of this invention will be apparent to those skilled in the art from the detailed description and drawings contained herein.

DETAILED DESCRIPTION OF THE PREFERRED EMBODIMENT

Figure 1:
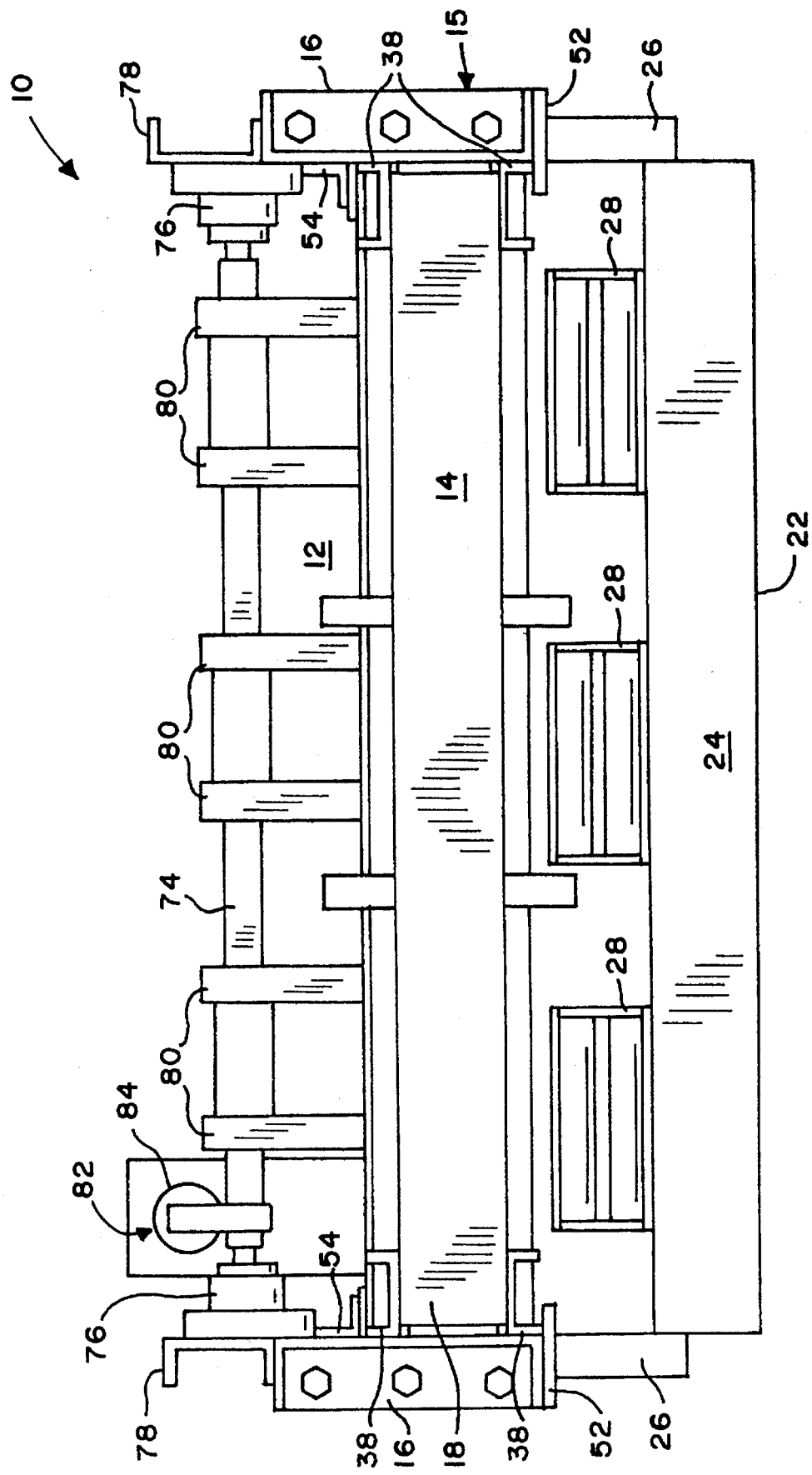
FIG. 1 is a top plan view of the slat removing and nail stubble eliminating apparatus of the present invention.
Figure 3:
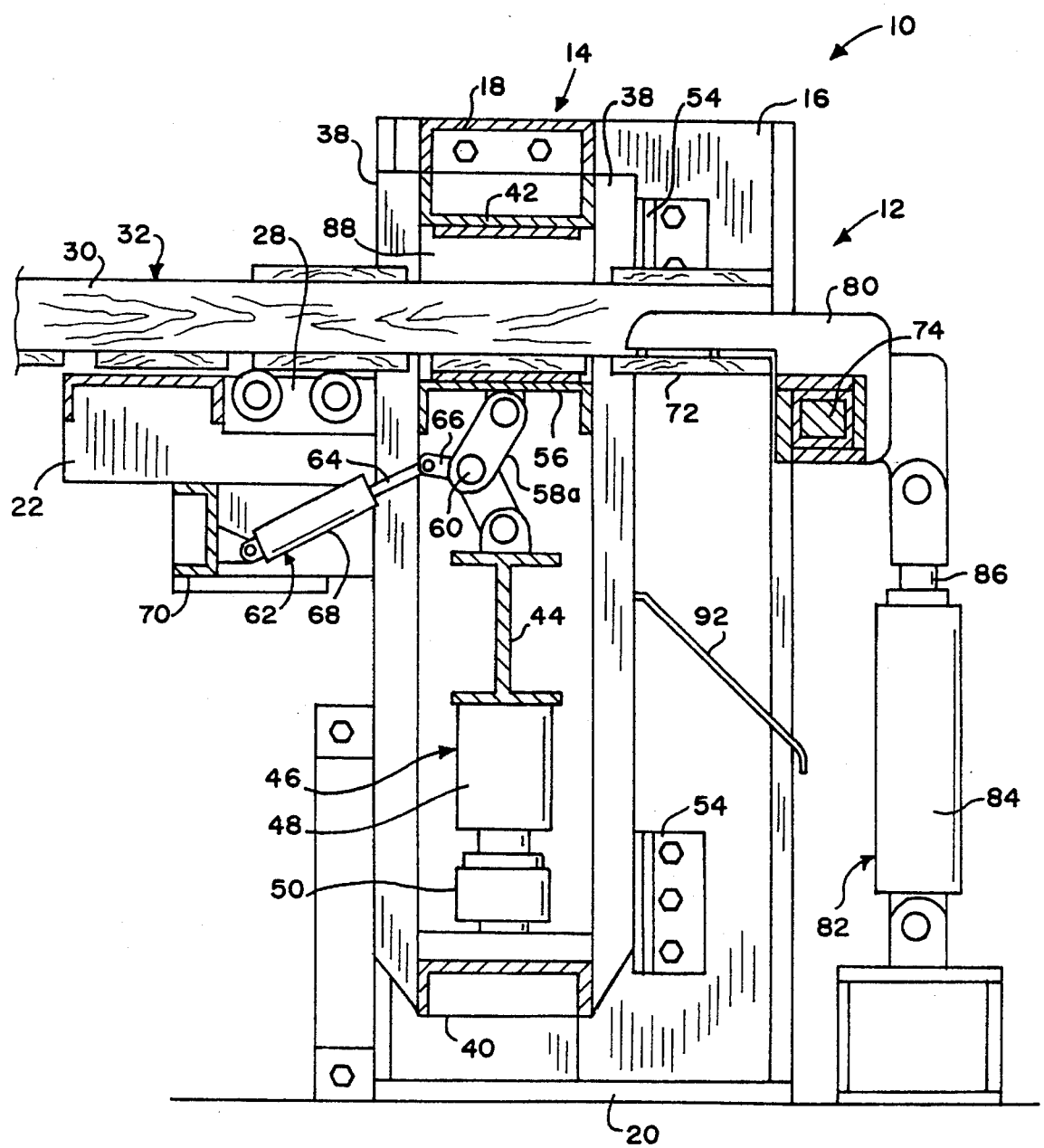
FIG. 3 is an enlarged fragmentary side view of the present invention, showing a pallet in position prior to removal of a damaged slat.

Referring initially to FIGS. 1 and 3, pallet repair apparatus 10 is shown having a slat removal station 12 and nail stubble elimination station 14, bounded peripherally by a stationary frame assembly 15 comprising side channels 16, top channel 18, and bottom plate 20. For purposes of this detailed description, it will be understood by those skilled in the art that the structural components of apparatus 10 are formed of a suitable material such as steel, and conventional fastening techniques such as welding and/or bolting are employed as necessary. Those skilled in the art will also understand that the term "nail stubble" will apply to any portion of a nail extending from the surface of a stringer after removal of a damaged slat, and will be equally applicable to staples or any other mechanical fastening means suitable for use in building pallets, whether conventional or unique. The principals of the present invention may be applied and altered as necessary to accommodate any type of pallet.

Figure 2:
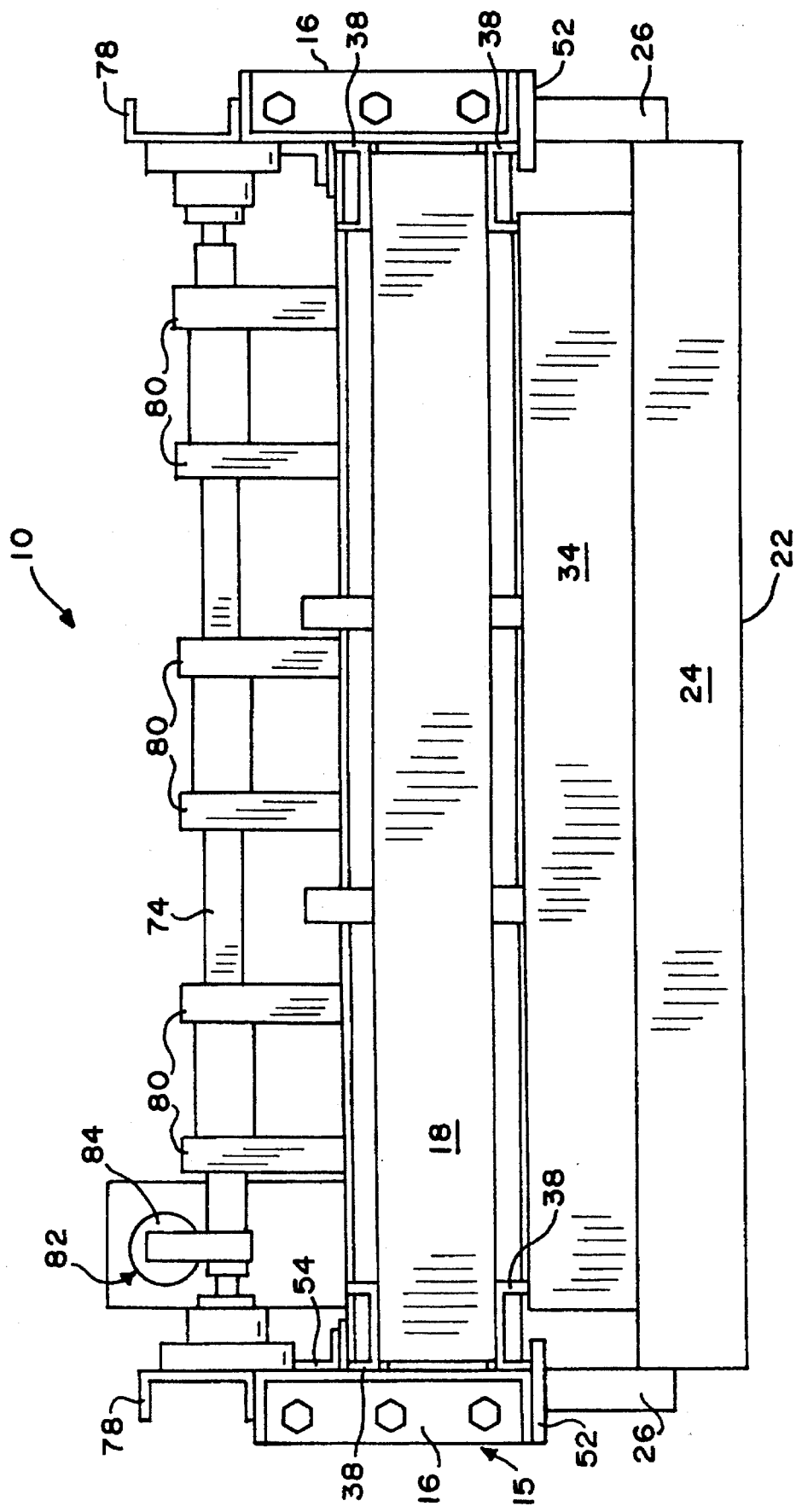
FIG. 2 is a top plan view of an alternative embodiment of this invention.

Referring again primarily to FIGS. 1 and 3, guide mechanism 22 is rigidly secured to the front surface of side channels 16, and consists of leading edge plate 24, brackets 26, and roller guide assemblies 28. It will be understood that, for purposes of the preferred embodiment illustrated and described herein, three such roller guide assemblies 28 are secured to leading edge plate 24 to align with the three stringers 30 utilized in a typical pallet 32. This is simply a matter of convenience, and the number of roller guide assemblies 28 may be varied as desired without departing whatsoever from the principals of this invention. In fact, roller guide assemblies 28 may be eliminated altogether, as shown in FIG. 2, wherein roller guide assemblies 28 have been replaced by a flat plate 34 welded to leading edge plate 24. The purpose of guide mechanism 22 is to guide the pallet 32 into the slat removal station 12 and nail stubble elimination station 14 for acceptable operation thereof. It will be fully appreciated that the detailed configuration of guide mechanism 22 is largely arbitrary for purposes of this invention.

Yoke assembly 36 is contained within frame assembly 15, and comprises side members 38 rigidly secured to lower member 40 and upper press bar 42. In the preferred embodiment of apparatus 10, there are four side members 38, two in front of lower member 40 and upper press bar 42, and two identical members in the rear thereof, as indicated in FIGS. 1 and 2. Spanning side channels 16 of stationary frame assembly 15 is a central beam member 44, the opposite ends of which preferably pass between front and rear side members 38 of yoke assembly 36 and are rigidly attached to side channels 16.

Figure 7:
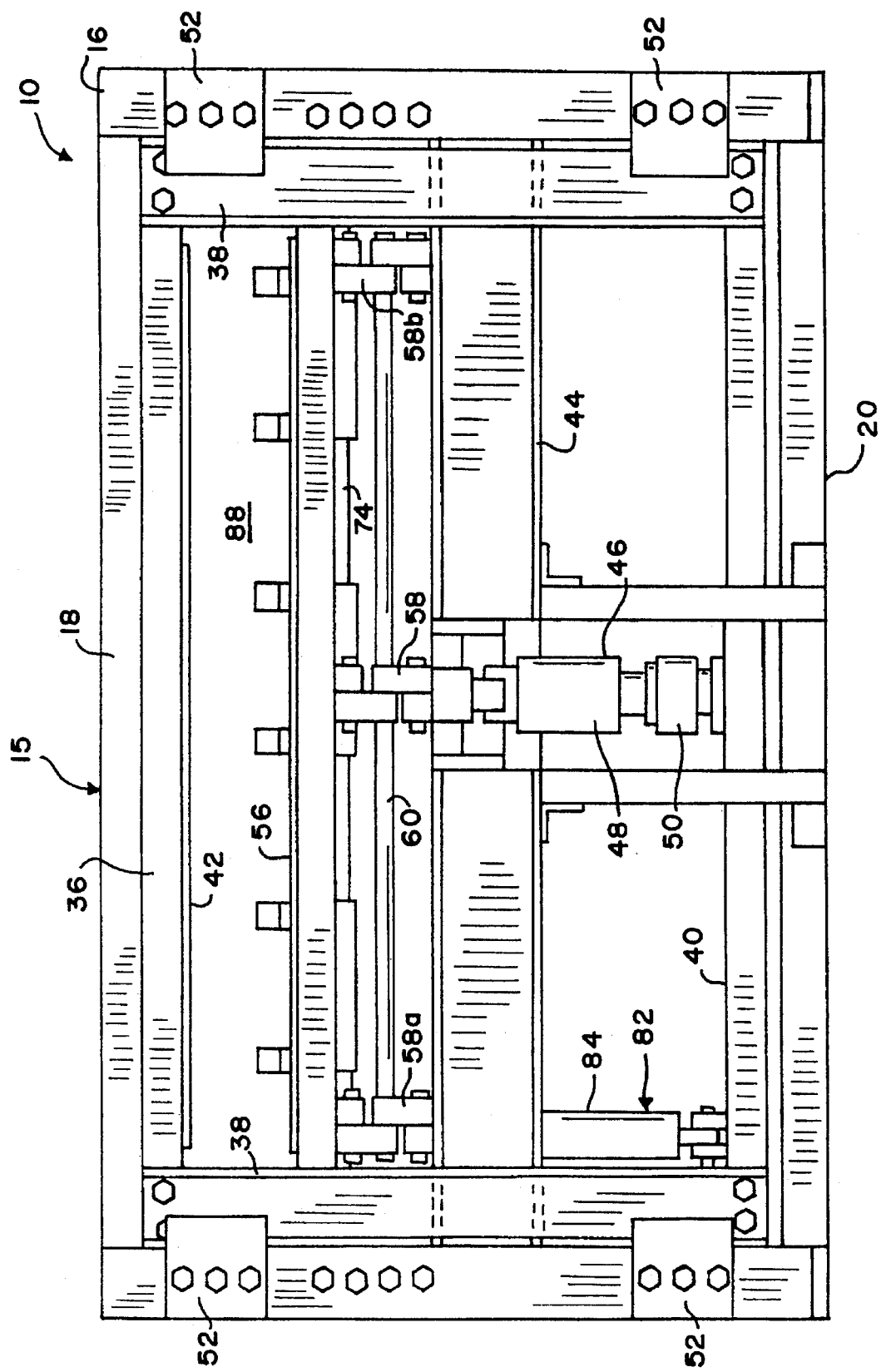
FIG. 7 is a front elevational view of the present invention, with a front portion being removed for clarity, showing the nail stubble elimination station in its open position.
Figure 8:
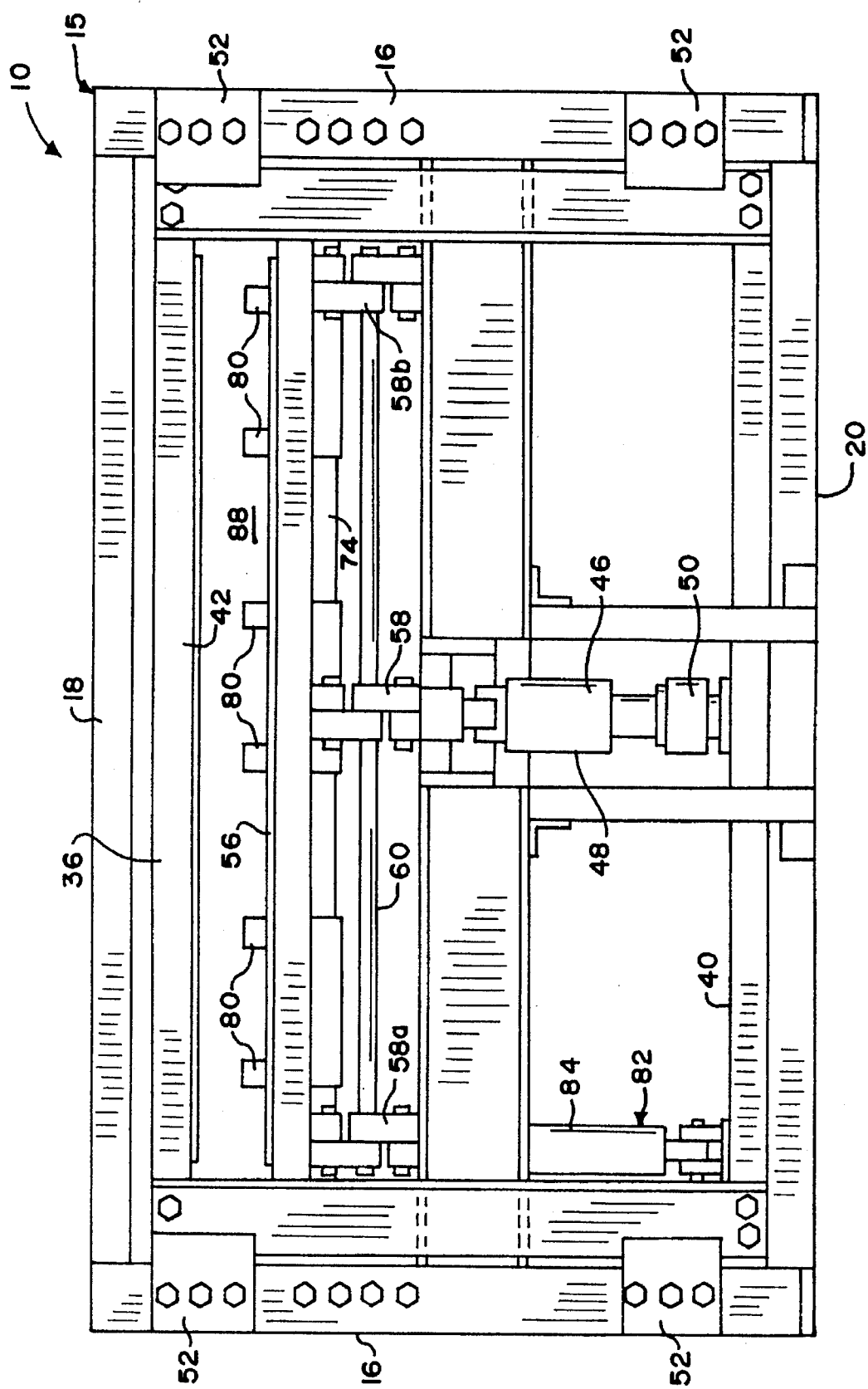
FIG. 8 is a front elevational view similar to FIG. 7, showing the nail stubble elimination station in its flattening position.

In the center portion of beam 44 is mounted hydraulic actuator 46, having a cylinder member 48 and a piston member 50. Hydraulic actuator 46 is of generally conventional design and construction, so the details need not be discussed herein for purposes of this invention. Piston member 50 is attached to lower member 40 of yoke assembly 36, whereby operation of hydraulic actuator 46 selectively moves yoke assembly 36 upward and downward between a raised position, as shown in FIG. 7, and a lowered position as shown in FIG. 8. Fore and aft movement of yoke assembly 36 is restrained by guide members 52 and 54 which preferably comprise sections of steel plate or angle iron, respectively, bolted or otherwise attached to side channels 16. To assist in the sliding movement of yoke assembly 36, a suitable low friction material is preferably disposed between guide members 52 and 54 and the adjacent surfaces of side members 38. Similarly, the inner surfaces (not shown) of side channels 16 of frame assembly 15 may be lined with a suitable low friction material, such a nylon, Teflon, or the like.

Nail stubble elimination station 14 further comprises lower press bar 56, having a plurality of link assemblies 58 attached to the underside thereof. In the preferred embodiment shown, there are three such link assemblies 58, identified by reference numerals 58, 58a, and 58b, as shown in FIG. 7, the center of each link assembly pivotally mounted to rod 60. The top of each link assembly 58 is pivotally secured to the underside of lower press bar 56, and the lower portion of each link assembly 58 is pivotally secured to the top of beam 44. As shown in FIGS. 3–6, the end link assemblies 58a and 58b have pneumatic actuator 62 operatively secured to a central portion thereof, with piston member 64 being attached to lug 66 and cylinder member 68 being attached to structural support member 70 which, in turn, is secured to side channel 16.

Figure 4:
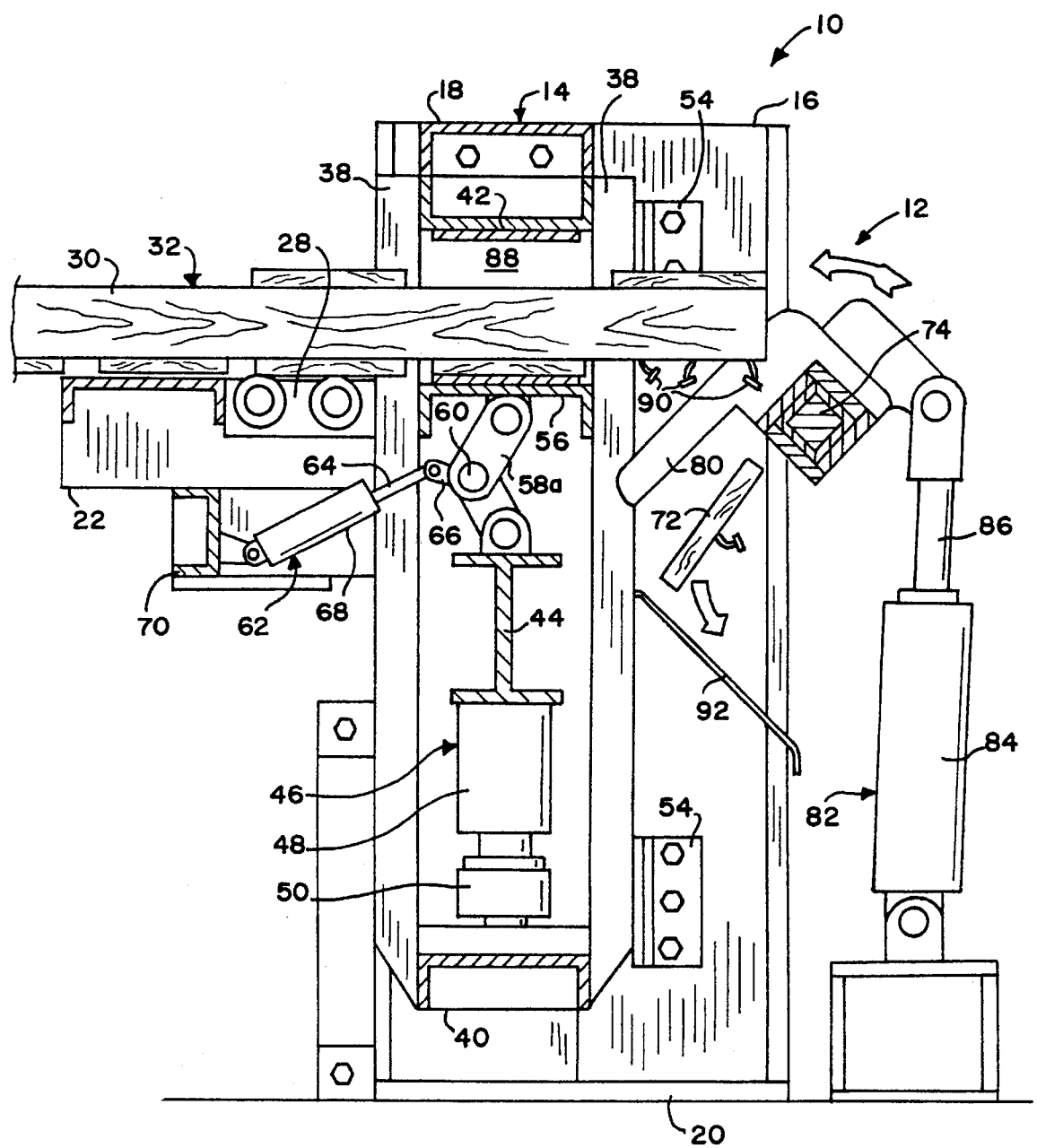
FIG. 4 is a fragmentary side view similar to FIG. 3, showing the removal of the damaged slat.
Figure 5:
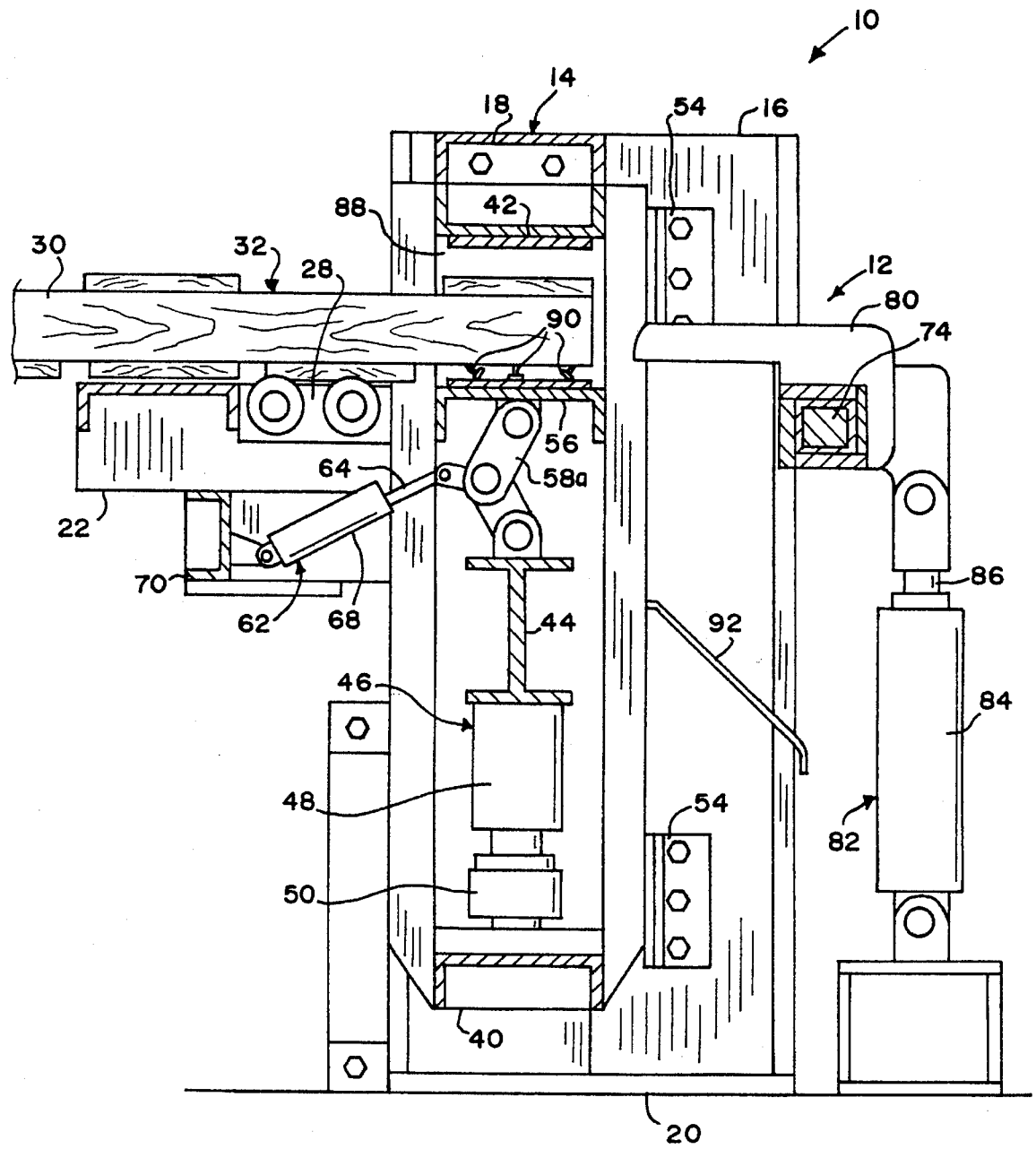
FIG. 5 is a fragmentary side view similar to FIG. 3, showing the pallet in position for nail stubble elimination.
Figure 6:
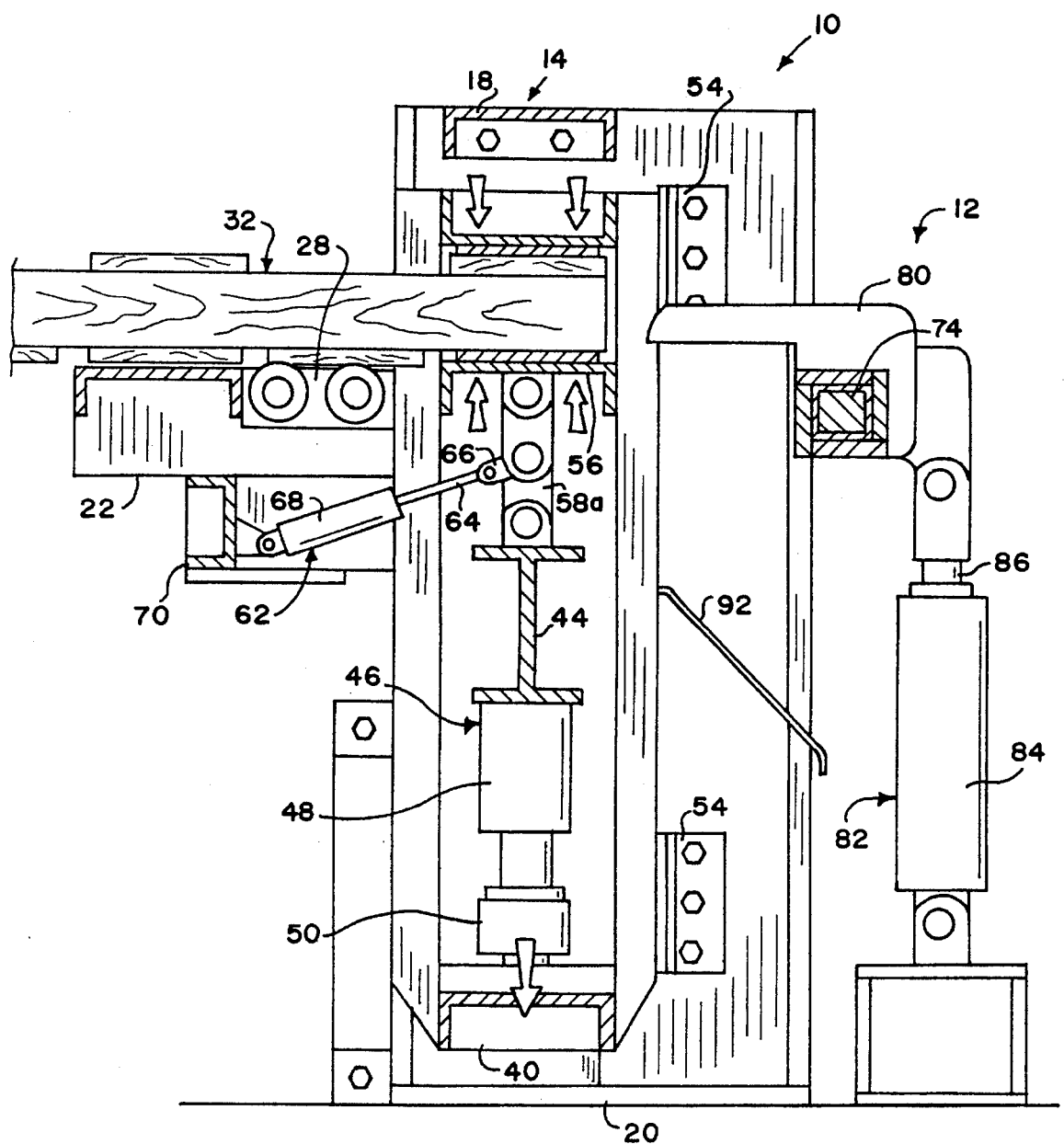
FIG. 6 is a fragmentary side view similar to FIG. 3, illustrating the nail stubble elimination step.

Pneumatic actuator 62 is of a purely conventional design, so the details of its construction need not be discussed herein. As shown in FIGS. 3–5, retraction of piston member 64 pulls rod 60 forward, thereby bending link assemblies 58 and moving lower press bar 56 to a lowered position. As shown in FIG. 6, extension of piston member 64 drives rod 60 rearward, thereby straightening link assemblies 58 and moving lower press bar 56 to its raised position. As those skilled in the art will understand upon reading this specification, it is preferred that the total vertical movement of lower press bar 56 be approximately 0.75" to compensate for the removed slat 72. While conventional slats typically have a thickness of approximately 0.75", it will be readily appreciated that the configuration of link assemblies 58 and total movement effected by pneumatic actuator 62 may be adjusted as necessary to obtain the desired results.

Slat removal station 12 comprises a rotating bar 74 having opposite ends retained within bearings 76 which are secured to side channels 16 and support channels 78. Slat removal fingers 80 extend transversely from rotating bar 74 and are adapted to rotate therewith. Actuator 82, preferably comprising a hydraulic cylinder 84 and reciprocating piston 86, is drivingly connected to bar 74 so that extension of piston 86 effects rotation of bar 74, thereby rotating fingers 80 downwardly.

In the embodiment illustrated herein, fingers 80 are grouped in pairs, with each pair being independently movable longitudinally along bar 74 to accommodate a variety of pallets. It is to be understood, however, that virtually any known slat removal technique may be employed with the present invention without departing from the principals taught herein. It is contemplated, for example, that fingers 80 may be replaced by horizontal plates, or by angled members which move vertically rather than rotationally. The structure of slat removal station 12 is intended to be by way of example only, and is not to be considered a limitation to the scope of this invention.

The preferred operation of apparatus 10 is described as follows. The end of a pallet 32 having a damaged slat 72 is inserted through opening 88 formed through frame assembly 16 and yoke assembly 36, and bounded on the top by upper press bar 42 and on the bottom by lower press bar 56. Initially, as shown in FIG. 3, lower press bar 56 is maintained in its lowered position wherein its top surface is substantially co-planar with the top surface of guide mechanism 22, and yoke assembly 36 is in its raised position, thereby facilitating the insertion of pallet 32 and the placement of the damaged end into slat removal station 12, whereupon fingers 80 are disposed adjacent the upper surface of damaged slat 72. While the operator (not shown) supports the distal end of pallet 32, actuator 82 is activated to rotate bar 74, as shown in FIG. 4, thereby pulling slat 72 away from stringers 30 and exposing nail portions 90. Deflection plate 92 is suspended between side channels 16 beneath fingers 80, and extends rearwardly and downwardly to deflect slat 72 away from apparatus 10, preferably onto a conveyor for moving slat 72 to another area for further processing.

Upon removal of damaged slat 72, the operator may then pull pallet 32 back through opening 88 to align nail portions 90 with lower press bar 56 in nail stubble elimination station 14, as shown in FIG. 5. While continuing to support the distal end of pallet 32, the operator may then activate hydraulic actuator 46 and pneumatic actuators 62, thereby forcibly driving yoke assembly 36 and upper press bar 42 to their lowered position and lower press bar 56 to its upper position, as shown in FIG. 6. Preferably, the synchronization of pneumatic actuators 62 and hydraulic actuator 46 results in simultaneous convergent of upper press bar 42 and lower press bar 56, thereby effecting a rapid clamping of the end of pallet 32 and simultaneous flattening of nail portions 90. In some situations, however, it has been found desirable to slightly retard the operation of either pneumatic actuators 62 or hydraulic actuator 46, relative to the other, in order to achieve optimum results. Finally, the operator may release hydraulic actuator 46 and pneumatic actuators 62 and withdraw pallet 32 from opening 88. Pallet 32 is now in acceptable condition for a replacement slat to be nailed or otherwise fastened in place of the removed damaged slat 72. It will be understood that, if another slat is also damaged, the operator may simply re-position pallet 32 as necessary and repeat the above operation before sending pallet 32 to the next operating station for replacement of removed slats.

It is preferable for the facing surfaces of upper press bar 42 and lower press bar to 56 be covered with a hardened material such as a section of hardened steel plate, to reduce wear on these surfaces. Furthermore, it is expected that foot controls in the vicinity of the operator will be utilized to activate hydraulic actuator 46, pneumatic actuators 62, and actuator 82. In this regard, it may be preferable to utilize a pair of such foot controls, with a first foot control operating actuator 82, and a second control operating both hydraulic actuator 46 and pneumatic actuators 62 in response to a single input from the operator. When foot controls are used as expected, the operator is free to support and move the pallet with his or her hands, while operating apparatus 10 for its intended function with his or her feet.

It is to be understood that numerous mechanical and structural modifications may be made without departing from the scope of coverage to which this invention is entitled. The various hydraulic and pneumatic actuating mechanisms, for example, may be varied considerably utilizing any number of conventional techniques. In particular, pneumatic actuators 62 and link assemblies 58 may be replaced by a pair of smaller hydraulic actuators mounted directly beneath lower press bar 56 and attached to beam 44. Additionally, it is contemplated that lower press bar 56 and guide mechanism 22 may move together as a unit, and that the movement of yoke assembly 36 may be eliminated entirely.

While the principal of incorporating slat removal means and nail stubble elimination means into a single apparatus has been made clear, it will be immediately apparent to those skilled in the art that there are many possible modifications to the disclosed arrangement without departing from the basic spirit and scope of the present invention. Accordingly, the following claims are intended to cover and embrace not only the specific embodiments disclosed herein, but also such modifications within the spirit and scope of this invention.

What is claimed is:

1. Apparatus for removing a damaged slat from a wooden pallet and for eliminating the nail stubble resulting from such removal, said pallet having a plurality of longitudinal stringers and a plurality of transverse slats nailed thereto, said slats defining top and bottom surfaces for said pallet, said apparatus comprising:

a vertically disposed stationary outer frame assembly, having a pair of laterally spaced apart side members and vertically spaced apart top and bottom members, said frame assembly including an opening for receiving a first end portion of said pallet, said opening having vertically spaced upper and lower surfaces;

slat removal means attached to said frame assembly adjacent said opening, selectively operable to remove said damaged slat from said first end of said pallet, thereby exposing at least some of the nails previously securing said damaged slat to said stringers; and nail stubble removal means attached to said frame assembly within said opening, selectively operable to flatten said exposed nails such that a replacement slat may be secured to said stringers in place of said damaged slat.

2. Apparatus as set forth in claim 1, wherein:

said nail stubble removal means is operable to flatten substantially all of said exposed nails in a single operation.

3. Apparatus as set forth in claim 1, wherein said nail stubble removal means comprises:

a yoke assembly slidably disposed within said frame assembly having an upper press bar defining said upper surface of said opening, said upper press bar being selectively moveable between first and second positions;

a lower press bar slidably disposed within said yoke assembly facing said upper press bar, said lower press bar defining said lower surface of said opening and being selectively moveable between first and second positions; and driving means for selectively moving said yoke assembly and said lower press bar between said first and second positions, wherein said upper and lower press bars diverge when moved to said first positions, thereby allowing said first end of said pallet to pass through said opening, and converge when moved to said second positions thereby clamping said first end therebetween such that said upper press bar engages said top surface of said pallet and said lower press bar flattens said exposed nails.

4. Apparatus as set forth in claim 3, wherein said driving means comprises:

first actuating means secured to said frame assembly for forcibly driving said yoke assembly downward to said second position, said yoke being normally biased in its upward first position; and second actuating means secured to said frame assembly for forcibly driving said lower press bar upward to said second position, said lower press bar being normally biased in its downward first position.

5. Apparatus as set forth in claim 4, wherein:

said first actuating means comprises a hydraulic actuator; and said second actuating means comprises a pair of pneumatic actuators.

6. Apparatus as set forth in claim 3 wherein:

said first and second actuating means are synchronized, whereby said upper and lower press bars are moved to said second positions substantially simultaneously.

7. Apparatus for use by an operator in repairing a damaged wooden pallet, said pallet comprising a plurality of longitudinal stringers having a plurality of transverse slats nailed thereto, said apparatus comprising:

a first station for removing a damaged slat from an end of said pallet, thereby exposing the nails used to secure said damaged slat to said stringer, said nails being partially imbedded in said stringer; and a second station incorporating means for flattening said exposed nails, said flattening means being selectively operable by said user to simultaneously flatten substantially all of said exposed nails, thereby preparing said pallet for the installation of a replacement slat to replace said damaged slat.

8. Apparatus as set forth in claim 7, wherein;

said first and second stations are disposed adjacent one another; and said first and second stations are aligned, whereby said operator is able to utilize both said first station to remove said damaged slat and said second station to flatten said exposed nails while said operator is positioned in substantially the same operating location.

* * * * *